(12) United States Patent
Mylly et al.

(10) Patent No.: US 10,140,055 B2
(45) Date of Patent: Nov. 27, 2018

(54) ENSURING THAT MEMORY DEVICE ACTIONS ARE VALID USING REFERENCE VALUES

(71) Applicant: Memory Technologies LLC, Las Vegas, NV (US)

(72) Inventors: Kimmo J. Mylly, Ylojarvi (FI); Jani Hyvonen, Tampere (FI)

(73) Assignee: Memory Technologies LLC, Kirkland, WA (US)

(*) Notice: Subject to any disclaimer, the term of this patent is extended or adjusted under 35 U.S.C. 154(b) by 0 days.

(21) Appl. No.: 15/383,631

(22) Filed: Dec. 19, 2016

(65) Prior Publication Data

US 2017/0177274 A1    Jun. 22, 2017

Related U.S. Application Data

(60) Provisional application No. 62/270,493, filed on Dec. 21, 2015.

(51) Int. Cl.
| | |
|---|---|
| *G06F 3/06* | (2006.01) |
| *G06F 12/02* | (2006.01) |
| *G06F 12/14* | (2006.01) |
| *G06F 17/30* | (2006.01) |
| *G06F 21/80* | (2013.01) |

(52) U.S. Cl.
CPC .......... *G06F 3/0653* (2013.01); *G06F 3/0619* (2013.01); *G06F 3/0644* (2013.01); *G06F 3/0673* (2013.01); *G06F 3/0679* (2013.01); *G06F 12/0246* (2013.01); *G06F 12/1433* (2013.01); *G06F 17/30* (2013.01); *G06F 21/80* (2013.01); *G06F 2212/1052* (2013.01)

(58) Field of Classification Search
None
See application file for complete search history.

(56) References Cited

U.S. PATENT DOCUMENTS

| | | |
|---|---|---|
| 2007/0271609 A1 | 11/2007 | Chen et al. |
| 2009/0119353 A1 | 5/2009 | Oh et al. |
| 2010/0262765 A1 | 10/2010 | Cheon et al. |
| 2014/0281173 A1 | 9/2014 | Im et al. |

OTHER PUBLICATIONS

PCT Search Report and Written Opinion dated Apr. 12, 2017 for PCT application No. PCT/US2016/067720, 12 pages.

*Primary Examiner* — Kevin Verbrugge
(74) *Attorney, Agent, or Firm* — Lee & Hayes, PLLC

(57) ABSTRACT

Described herein are techniques to ensure that an action (e.g., a read or a write by a host device) associated with an element of a memory device that stores a value is valid compared to a reference value. The reference value is associated with an actual characteristic of a memory. The element storing the value can be stored in a region of memory that is configured to store metadata. The element can be re-programmed after the memory device is manufactured, and thus, the value stored in the element can be modified by a host device so that it incorrectly or inaccurately reflects a characteristic of the memory. In contrast, the reference value is stored in a separate region of memory and the reference value is a true value.

18 Claims, 9 Drawing Sheets

300

```
┌─────────────────────────────────────────────────────────┐
│ MONITOR FOR AN OCCURRENCE OF AN ACTION ASSOCIATED WITH  │
│  ELEMENT THAT INDIVIDUALLY STORES A VALUE INDICATIVE OF A│
│      CHARACTERISTIC RELATED TO THE MEMORY DEVICE         │
│                          302                             │
└─────────────────────────────────────────────────────────┘
                            │
                            ▼
┌─────────────────────────────────────────────────────────┐
│  DETERMINE WHETHER THE ACTION ASSOCIATED WITH THE ELEMENT│
│  IS VALID COMPARED TO A REFERENCE VALUE ASSOCIATED WITH AN│
│                  ACTUAL CHARACTERISTIC                   │
│                          304                             │
└─────────────────────────────────────────────────────────┘
                            │
                            ▼
┌─────────────────────────────────────────────────────────┐
│ IMPLEMENT A CORRECTIVE ACTION IF ACTION ASSOCIATED WITH THE│
│   ELEMENT IS DETERMINED TO BE INVALID, OTHERWISE COMPLETE│
│             ACTION ASSOCIATED WITH THE ELEMENT           │
│                          306                             │
└─────────────────────────────────────────────────────────┘
```

FIG. 3

ENSURING THAT MEMORY DEVICE ACTIONS ARE VALID USING REFERENCE VALUES

CROSS REFERENCE TO RELATED APPLICATIONS

This patent application claims priority filing benefit from U.S. Provisional Patent Application No. 62/270,493, filed Dec. 21, 2015, which is hereby incorporated by reference, in its entirety.

BACKGROUND

Memory devices (e.g., storage modules), such as Managed NAND storage modules, are used in association with a variety of types of "host" devices including mobile phone devices (e.g., a smartphone), tablet devices, global positioning system (GPS) devices, electronic book devices, media player devices, etc. Examples of memory devices include a secure digital (SD) card, an embedded MultiMediaCard (eMMC), a Universal Flash Storage (UFS), a solid-state drive (SSD) module, and so forth. A memory device stores data for use by a host device that is coupled to the memory device, including operating system code, applications, and user data (e.g., photo data, video data, etc.). Additionally, a memory device stores other types of data for use by the host device or for use by the memory device itself, including metadata and configuration data.

As the functionality of host devices increases, and as users create more user data (e.g., downloaded apps, images, messages, etc.), the memory device is being tasked with storing more data. Thus, accurate reflection of the storage capacity and other characteristics of the memory device have an added importance to a user of a host device, and to the memory device itself (e.g., for optimal performance). For example, a user may want a memory device storing 64 gigabytes (GB) (e.g., a 64 GB SDXC card for the user's mobile phone) instead of a memory device storing 16 GB (e.g., a 16 GB SDHC card).

Recently, counterfeiters have been modifying information stored in a memory device so the memory capacity is not accurately reflected when the information is accessed and read out from the memory device. Also, other information stored in a memory device may not match actual characteristics of the memory device preventing the memory device from operating in an optimum manner. For instance, partition information of a 16 GB memory device may be modified so that it falsely appears as a 64 GB memory device to a host. Consequently, this partition information can be modified information that is incorrect or inaccurate. That is, the memory device may actually be a lower density card (e.g., a 16 GB SDHC card) that has been modified by a counterfeiter to look like higher density card (e.g., a 64 GB SDXC card). In another example, a start of an actual data area of a partition may not be within a proper block boundary.

In some instances, a customer may pay a purchase price for a memory device that appears to be able to store a larger amount of data (e.g., 64 GB) when the memory device actually is only able to store a smaller amount of data (e.g. 16 GB). The customer is eventually disappointed in the performance of the memory device based on the inaccurate and false information. For instance, the customer may realize that the memory device is unable to write data to an address which exceeds the actual density of the memory device. Or the customer may realize that the memory device is corrupted when data is written to an address which exceeds the actual density of the memory device.

BRIEF DESCRIPTION OF THE DRAWINGS

FIG. 3 illustrates an example process that monitors for an occurrence of an action associated with an element storing a value and that ensures that (i) the action is valid or (ii) the value stored in the element is valid. The example process can be implemented by a memory device.

FIG. 7 illustrates a single physical partition that implements Master Boot Record (MBR) partitioning and a File Allocation Table (FAT) file system.

FIG. 8 illustrates a single physical partition that implements GUID Partition Table (GPT) partitioning and a FAT file system.

FIG. 9 illustrates multiple physical partitions and multiple primary partitions that can individually implement MBR partitioning and a FAT file system.

Figure 1:
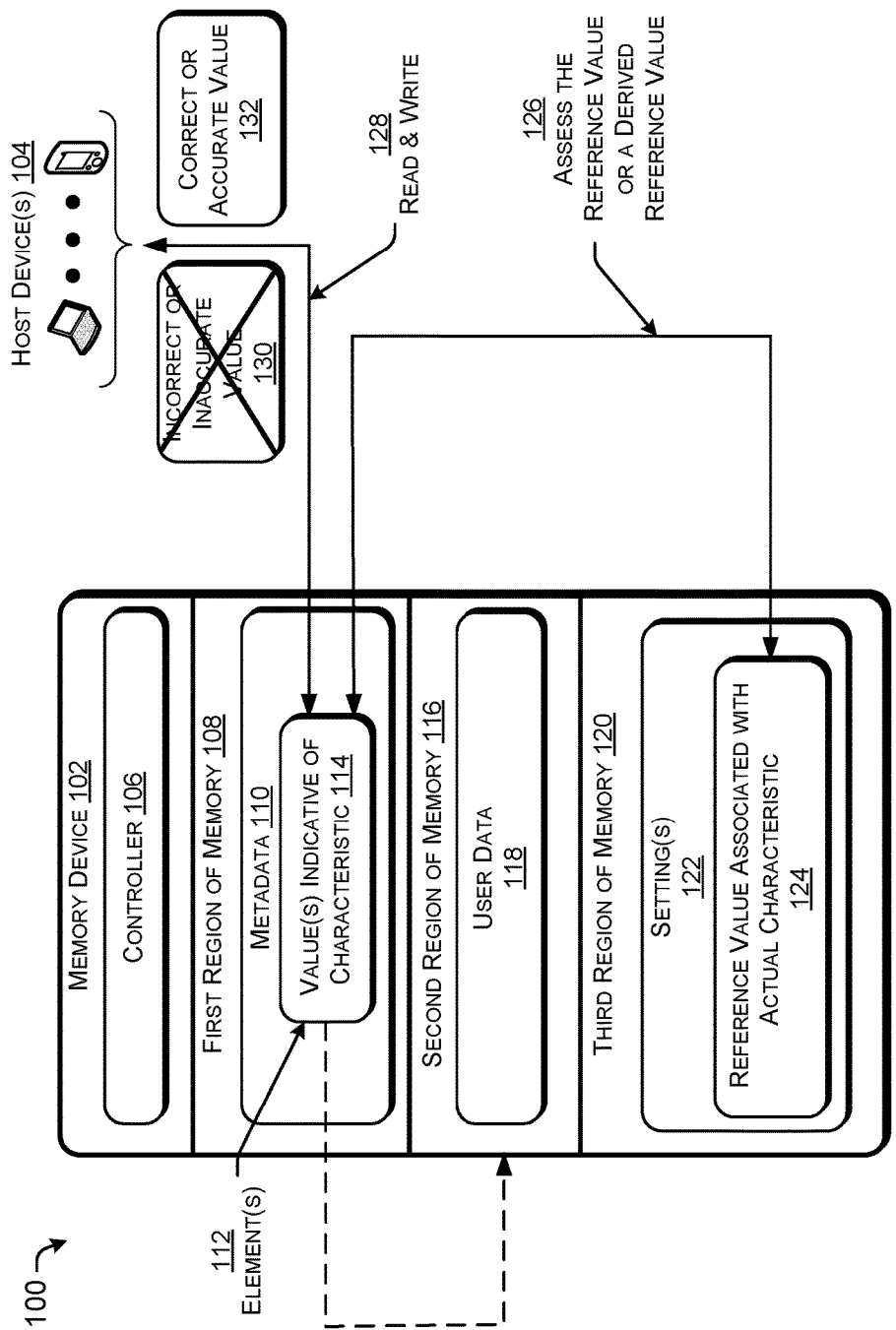
FIG. 1 illustrates an example environment in which a memory device is configured to ensure that an action associated with an element storing a value is valid via the use of a reference value. The value stored by the element can be indicative of a characteristic (e.g., capacity) related to at least one portion of memory.

The Figures depict embodiments and/or examples of the present invention for purposes of illustration only. One skilled in the art will readily recognize from the following discussion that alternative implementations and/or alternative examples of the structures and methods illustrated herein can be employed without departing from the principles described herein.

DETAILED DESCRIPTION

The following description is presented to enable a person of ordinary skill in the art to make and use the various implementations. Descriptions of specific devices, techniques, and applications are provided as examples. Various modifications to the examples described herein may be readily apparent to those of ordinary skill in the art, and the general principles defined herein may be applied to other examples without departing from the scope of the various implementations. Thus, the various implementations are not intended to be limited to the examples described herein, but are to be accorded the scope consistent with the claims.

The present disclosure describes techniques to ensure that an action (e.g., a read or a write by a host device, etc.) associated with an element of a memory device that stores a value is valid compared to a reference value (e.g., results in a valid outcome). The reference value is associated with an actual characteristic of the memory device (e.g., a size or an amount of a memory capacity, a size or an amount of a primary partition capacity, etc.). In at least one implementation, the element storing the value is stored in a region of the memory that is used for storing metadata (e.g., partitioning metadata, data related to system structures of the memory device, etc.). This region that includes the element is visible to the host device, and thus, the element can be read and re-programmed after the memory device is manufactured. Consequently, the value stored in the element can be modified by a host device (e.g., being controlled by a counterfeiter) so that it incorrectly or inaccurately reflects an actual characteristic of the memory device.

In contrast, the reference value is stored in a region of memory (e.g., associated with a register, a descriptor, an attribute, a flag, etc.) containing settings that may be read but (i) cannot be re-programmed after the memory device is manufactured (e.g., the setting is one-time programmable), (ii) can only be re-programmed or altered in control of the memory device and not in control of a host device (e.g., a dynamic capacity adjustment initiated and controlled by the memory device), or (iii) require authentication of a host device if reference values stored therein are to be modified. This region of the memory device that includes the reference values may or may not be visible to the host device. In various examples, the reference value can only be programmed by a manufacturer of the memory device during a manufacturing stage, and therefore, the reference value cannot be modified by a host device after the memory device is manufactured. Accordingly, the reference value is a true value that correctly and accurately reflects an actual characteristic of the memory device.

In various examples, a "write" action associated with an element that stores a value is valid if the value to be written to the element (e.g., by a host device), if the value eventually written to the element (e.g. by the memory controller), or if a value that remains stored in the element, is valid compared to a reference value. In various examples, a "read" action associated with an element that stores a value is valid if the value being read from the element is valid compared to a reference value or if a valid value is being delivered to the host device based on a reference value.

In one implementation, the reference value may be associated with a memory capacity of the memory device. For example, a secure digital (SD) card that comprises a set of CSD registers which can include a specific C_SIZE register that stores a reference value that reflects, or is useable to derive, the actual memory capacity of the SD card (e.g., a size of a Master Boot Record (MBR) primary partition within the single physical partition of the SD card). Accordingly, the SD card can use the reference value stored in the C_SIZE register to ensure that a capacity value written, by a host device, to an area of the SD card (e.g., the "element" further discussed herein that can be located in the partition metadata region) other than the C_SIZE register is valid (e.g., via a comparison of the written value to the reference value stored in the C_SIZE register). The SD card can also use the reference value stored in the C_SIZE register to derive (e.g., calculate) a derived reference value and to ensure that a capacity value read, by a host device, from an area of the SD card other than the C_SIZE register is valid. For instance, the derived reference value can be the reference value stored in the C_SIZE register (e.g., a size of the single physical partition of the SD card) minus a size of the partition metadata region. In this case regarding memory capacity, the written value or the read value, as well as an action associated therewith, is valid if it is less than or equal to the reference value or the derived reference value, but not if it exceeds the reference value or the derived reference value.

Consequently, the techniques discussed herein establish a link between (i) a reference value stored in one region of memory that cannot be re-programmed, that can only be re-programmed or altered in control of the memory device, or that requires authentication to be re-programmed and (ii) a relative value currently stored in another region of the memory that can be re-programmed (e.g., without authentication). The techniques use the established link to ensure that an action (e.g., a read or a write by a host device) related to the relative value is valid.

FIG. 1 illustrates an example environment 100 in which the present disclosure can be implemented. For instance, in the example environment 100, a memory device 102 is configured to ensure that an action associated with an element storing a value is valid compared to a reference value. The action can be implemented by, or in accordance with, a host device 104. For example, the action can be associated with a read or a write by the host device 104.

A host device 104 can comprise a smartphone device, a wearable device (e.g., a watch, a pair of glasses, a heart rate monitoring device, etc.), a laptop computer, a tablet device, an image capture device (e.g., a camera, a video recording device, etc.), a netbook device, a gaming console device, a personal computing device (e.g., a desktop computer), a server device, a set top box device, a home device (e.g., an appliance device, a thermostat device, a garage door device, etc.), or any other electronic device that may require storage by a memory device that is connected, or coupled, to the host device. In some examples, the host device 104 can include a display (e.g., a touch display), a bus that connects the display to a processor, and/or a graphics subsystem that handles the display of graphics and text on the display. The host device 104 can also contain one or more of: host system memory such as dynamic random-access memory (DRAM), sensors (e.g., accelerometers, gyroscope, GPS, etc.), input/output components (I/O) (e.g., a speaker, a microphone, or a keyboard), and communications interface(s) (e.g., Cellular, USB, Wi-Fi, Bluetooth, or other wired or wireless interfaces).

In various implementations, the memory device 102 can be contained within a package, e.g., a ball grid array (BGA) package that is designed to be mounted on a printed circuit board. For instance, the memory device 102 can be an embedded MultiMediaCard (eMMC) or a Universal Flash Storage (UFS) module. Alternatively, the memory device 102 can be contained within a removable card (e.g., a SD card) that fits within a slot on the host device 104, within a semi-removable device such as a solid-state device (SSD) module, or within a PC/server card/module (e.g., a Peripheral Component Interconnect Express (PCIe) card). Additionally, the memory device 102 can be one self-contained device or can be implemented as a collection of interconnected devices.

The memory device 102 includes a controller 106 (e.g., a memory controller). The controller 106 is configured to communicate, in accordance with a read and/or a write request, data between memory (e.g., storage) of the memory device 102 (e.g., often times referred to as mass storage, non-volatile memory, or mass memory) and the host device 104. In various implementations, the controller 106 can include control circuit(s) for controlling the operation of the controller 106, random access memory (RAM) for storing operating information and/or for providing temporary storage within the memory device 102, clock generation circuit(s) for generating internal clocking signals, receiver circuit(s) for receiving data and/or commands from a host device 104 (e.g., a host controller or other processing unit of a host device), and/or transmitter circuit(s) for transmitting data and/or status information to the host device 104 (e.g., the host controller). Moreover, the controller 106 can be connected to the memory of the memory device 102 through at least one bus, which allows the controller 106 to communicate with the memory, such as read data from, and write data to, the memory. In various examples, storage can be implemented with a non-volatile memory such as a NAND flash memory having memory circuits and memory cells (e.g., NAND cells), each capable of storing one bit (single-level cell) or multiple bits (multi-level cell) of data. Other forms of non-volatile memory can also be used without departing from the present disclosure. For example, non-volatile memory can include phase change memory (PCM), magneto-resistive random-access memory (MRAM), resistive random-access memory (RRAM), ferroelectric random-access memory (FRAM), and so forth.

The memory of the memory device 102 can comprise address space that is visible to the host device 104. The visible address space may be considered as physical address space (e.g., the host has access to physical addresses of the non-volatile memory like NAND flash) or it may be considered as logical address space (e.g., the flash management function of a Managed NAND memory device converts the addresses received from the host to physical addresses of the non-volatile memory by using a logical-to-physical mapping table). For example, the address space can include one or multiple portions of memory. In some examples, portion(s) of memory can include MBR primary partition(s), GUID Partition Table (GPT) partition(s), physical partition(s) (e.g., general purpose partitions as defined in the eMMC standard), or logical unit(s) (LUs) (e.g., as defined in UFS standard). As discussed above, the memory (e.g., storage) of the memory device 102 can be divided into regions, where a region can be: (i) a designated area within an individual portion of memory (e.g., part of an MBR primary partition, a GPT partition, a physical partition, or an LU), (ii) a portion of memory (e.g., a region comprises a MBR primary partition, a GPT partition, a physical partition, or an LU), or (iii) one or more registers, descriptors, attributes, flags, etc. For instance, the first region and the second region, as further discussed herein with respect to FIG. 1, can be part of a single portion of a memory (e.g., an SD card with only a single physical partition that includes a first region for the Master Boot Record and a second region including the MBR primary partition). Or the first region and the second region can each comprise a separate portion of a memory (e.g., the metadata is stored in a first partition and the user data is stored in a second partition).

Accordingly, FIG. 1 illustrates a first region of memory 108 that is used to store metadata 110. The metadata 110 includes data related to how the host device 104 has arranged data in the memory device 102. Accordingly, the metadata 110 can be used (e.g., assessed) internally by the controller 106 of the memory device 102 (e.g., in accordance with a read or a write initiated by the host device 104). In various implementations, the metadata 110 can include partitioning information for the memory device 102, such as a Master Boot Record (MBR), a GUID Partition Table (GPT), or a Volume Boot Record (VBR). The MBR contains information regarding how an MBR primary partition is organized (e.g., located) on the memory of the memory device 102. The MBR can also contain executable code to function as a loader for an operating system installed on the host device 104. The GPT comprises a standard for the layout of a partition table using globally unique identifiers (GUID). The VBR contains code for bootstrapping programs (e.g., an operating system) stored in other parts of the memory device (e.g., the second region of memory discussed herein with respect to FIG. 1).

The metadata 110 stored in the first region of memory 108 can include one or more elements 112, where an individual element 112 is designated to store a value indicative of a characteristic 114 of the memory device 102. A characteristic 114 can be associated with a portion of memory or a region of memory. An individual element 112 can be assigned a particular address so that it can be identified by the host device 104 in association with a read or a write request. In one example, an individual element 112 can comprise a field (e.g., a four-byte field) that is accessible by the host device 104 via a known address and that indicates: a first address of a portion or a region of memory in the memory device, a last address of a portion or a region of memory in the memory device, a size (or length) of a portion or a region of memory in the memory device. As discussed above, the value(s) indicative of characteristic(s) 114 that are stored in the element(s) 112 can be re-programmed, and thus, the element(s) 112 are susceptible to modification by counterfeiters who want the memory device 102 to incorrectly or inaccurately reflect its characteristics and/or capabilities (e.g., memory capacity). For instance, reflection of an incorrect or an inaccurate value of a characteristic 114 can be associated with an action by the host device, such as a read request or a write request.

A second region of memory 116 can store, for example, user data 118. As discussed above, the second region of memory 116 can comprise, or be part of, one or more portions of memory (e.g., a primary partition, a physical partition, a LU, etc.) for storing user data 118 including downloaded apps, images (e.g., pictures, photos, videos, etc.), music, sensor data, etc. In various implementations, the second region of memory 116 can also store host data associated with, for example, an operating system. In some examples (e.g., an SD card), the second region of memory 116 can store file system architecture such as Partition Boot Sector, File Allocation Table(s) (FATs), and/or Root Directory. As illustrated in FIG. 1 by the dotted line and as further discussed herein, the value(s) indicative of characteristic(s) 114 can correspond to characteristics of the second region of memory 116.

A third region of memory 120 maintains settings 122, where an individual setting 122 stores a reference value associated with an actual characteristic 124 of the memory device 102. As discussed above, a reference value stored in an individual setting 122 is a correct and an accurate (e.g., a true or an optimum) value because the third region of memory 120 is programmed by a manufacturer of the memory device 102 during a manufacturing stage. In various implementations, a setting 122 in the third region of memory 120 may be protected such that a reference value stored therein is prohibited from subsequently being re-programmed by the host device 104. Thus, the third region of memory 120 can contain settings storing values that cannot be modified by the host device 104 after the memory device 102 is manufactured and deployed. In an alternative implementation, a setting 122 in the third region of memory 120 can be protected such that a reference value stored therein can be subsequently re-programmed by the host device 104, but only if the host device 104 is authenticated (e.g., the host device is authorized to modify a reference value stored in the setting 122). In yet another alternative implementation, the reference value can be re-programmed under control of the memory device (e.g., in association with mutual handshake with the host device).

Accordingly, the third region of memory 120 can comprise a set of hardware registers, descriptors, attributes, or flags (e.g., CSD registers in an SD card), that stores actual information about the capabilities of the memory device 102. The actual characteristic(s) 124 represented by the reference value(s) can be associated with one or more of: a total capacity of the memory device, a capacity of a region of the memory (e.g., the second region of memory 116), a capacity of the first region of memory 108 and the second region of memory 116 combined, a capacity of an individual portion of the memory (e.g., a primary partition, a physical partition, etc.), a start address of an individual portion or an individual region of the memory, an alignment of start addresses of individual portion(s) and/or individual region(s) of the memory (e.g., favorable address boundary), a size of an allocation unit of a portion of the memory, maximum and/or default latencies of the memory device, current consumption values of the memory device, etc. The techniques described herein ensure this information represented by the actual characteristics 124 is not distorted so that the memory device is prevented from conveying false information that is outside of its actual operational boundaries (e.g., prevented from conveying re-programmed information that pretends the memory device is something that it is not). The techniques can also ensure more optimized (e.g., higher performance, longer lifetime, etc.) operation of the memory device 102.

Therefore, the techniques discussed herein create a link between the elements 112 of the first region of memory 108 and the settings 122 of the third region of memory 120 (e.g., a link between a relative value currently stored in an element and a reference value stored in a setting). As referenced by 126, the controller 106 of the memory device 102 can assess (e.g., access, read, etc.) the reference value(s) associated with the actual characteristic 124, as stored in a setting(s) 122 of the third region of memory 120, to ensure that an action associated with an element 112 storing a relative value indicative of the same characteristic 114 is valid, or to ensure that the value that remains in the element is valid. The controller 106 of the memory device 102 can also and/or alternatively derive a derived reference value from a reference value stored in a setting 122. As referenced by 128, the action can be initiated by the host device 104, such as a read or a write request. The action can be invalid if the value read from, or written to, an element 112 of the first region of memory 108 is an incorrect or an inaccurate value, as referenced by 130. For instance, an action can be invalid if it reads or writes a value indicating that the capacity of a primary partition of an SD card is (close to) 64 GB when the actual memory capacity of the SD card is 16 GB. Consequently, the techniques described herein assess a reference value or a derived reference value to ensure that a correct or an accurate value is read from, or written to, an element 112, as referenced by 132. In such a case, the action can be considered valid.

In various implementations, a value read from, or written to, an element 112 does not necessarily have to match a reference value or a derived reference value in order to be correct and in order for the action to be valid. For example, the host device 104 can perform a valid action by writing a capacity (e.g., a primary partition capacity, a physical partition capacity, etc.) value to an element 112 that is less than a corresponding capacity stored in a setting 122 (e.g., the host device 104 programs a value to indicate a primary partition capacity of 12 GB when the reference value or the derived reference value indicates a capacity of, or close to, 16 GB). However, the host device 104 performs an invalid action by writing a primary partition capacity value to an element 112 that is more than a corresponding capacity stored in a setting 122 (e.g., the host device 104 programs a value to indicate a primary partition capacity of (close to) 64 GB when the reference value indicates a capacity of (close to) 16 GB).

In various implementations and due to different formats between information stored in the setting(s) 122 and information stored in the element(s) 112, the controller 106 can implement a conversion between differing formats. For instance, the controller 106 can convert the reference value or the derived reference value from a first format to a second format in accordance with an assessment. In one example, the memory capacity of an SD card (in Bytes) is calculated by the formula as follows:

$$(C\_SIZE+1)*512*1024.$$

In the case that MBR information being stored in the element 112 includes a start address and a size of a primary partition, the size can be indicated as a number of 512 Byte sectors. Thus, the following conversion for proper comparison can be made—the access is valid if:

$$(C\_SIZE+1)*512*1024 \geq (4 \text{ byte value of MBR offset}+1BEh+0Ch)*\text{sector size (e.g. 512B)}$$

In at least one implementation, a file system area (e.g., FATs) of a primary partition can be part of the first region of memory 108, and the file system area can contain an element 112 related to an actual characteristic of the actual data area of the primary partition, where the actual data area comprises, or is part of, the second region of memory 116.

Figure 2:
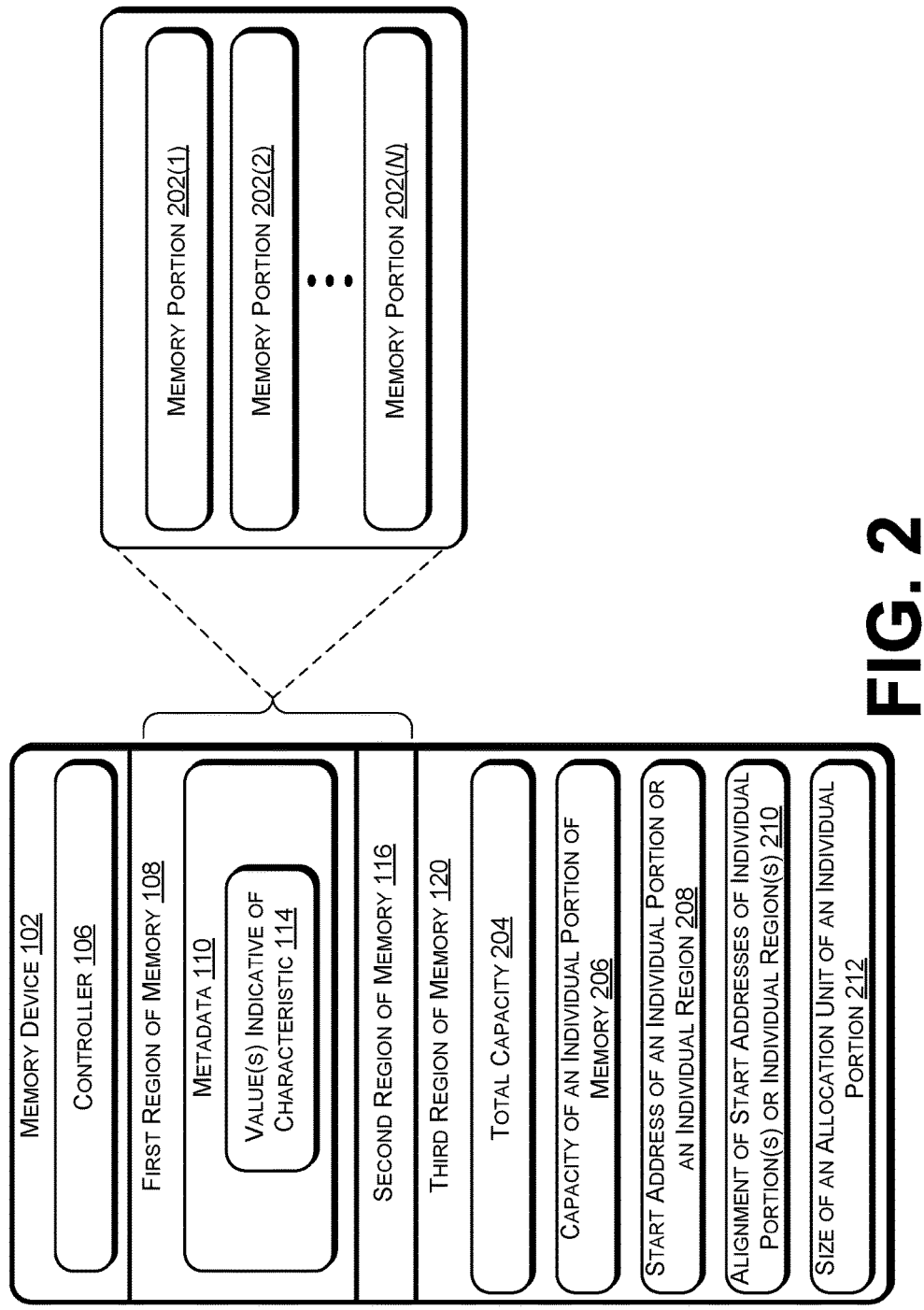
FIG. 2 illustrates additional details of an example memory device in which reference values are stored in one region of the memory while the values associated with the action are stored in another region of the memory that is susceptible to being re-programmed after the memory device is manufactured.

FIG. 2 illustrates additional details of the memory device 102 in which reference values are stored in one region of the memory (e.g., the third region of memory 120) while the elements 112 storing the values that are visible (e.g., accessible by) the host device 104 are stored in a different region of the memory that can be re-programmed (e.g., the first region of the memory 108). In alternative implementations, the third region of memory 120 can be located: in a flash memory (e.g., NAND) of the memory device 102, in an embedded non-volatile memory of the controller 106 (e.g., MRAM, flash, etc.), in ROM of the controller 106, in RAM embedded in or connected to the controller 106 (e.g., SRAM or DRAM), or in any combination of these (e.g., stored permanently in a flash memory but cached in RAM).

As illustrated in FIG. 2, the first region of the memory 108 and the second region of the memory 116 may be associated with one or more memory portions 202(1) ... 202(N) (where N is an integer number). As discussed, a memory portion 202(1) ... 202(N) can comprise a primary partition, a physical partition, or a logical unit (LU). In various examples, a memory portion 202(1) ... 202(V) can be divided into blocks, which can further be divided into pages. Accordingly, a memory of the memory device 102 can include a plurality of addressable memory locations. An addressable memory location can comprise, and identify, at least part of a memory portion 202(1) . . . 202(N), such as a memory block, a memory page, a sector, a byte of memory, and so forth. An address can be a logical address or a physical address.

FIG. 2 further illustrates examples of the actual characteristic(s) 124 represented by the reference value(s) stored in the settings 122 of FIG. 1. As discussed above, to protect the integrity of the reference values so they correctly and accurately reflect operational parameters and/or boundaries of the memory device, a setting 122 can be a one-time programmable setting so that it cannot be re-programmed (e.g., modified) after a manufacturer of the memory device initially programs the reference value. Alternatively, programming of a setting 122 can be associated with authentication to ensure that modification of the reference value stored therein only occurs in appropriate situations. Even further, programming of a setting 122 can be implemented under control of the memory device, but not under control of a host device (e.g., a dynamic capacity adjustment initiated and controlled by the memory device in association with a handshake between the memory device and the host device). In some instances, the setting 122 can be configured so that it prohibits modification of a reference value that is outside the known operational boundaries of the memory device. For example, a setting storing a reference value representative of a memory capacity can allow the reference value to be reduced to allocate additional reserve memory, but the setting may prohibit the reference value from being increased. Here, a reduction of memory capacity is still within the operational boundaries of the memory device but there is a chance that an increase in memory capacity may cause the reference value to exceed an operational boundary, and thus, the increase will not be allowed (to prevent counterfeit acts).

In one example, an actual characteristic can represent a total capacity 204 of memory in the memory device 102. In one implementation, the total capacity 204 can reflect a combination of the first region of memory 108 and the second region of memory 116. In some instances, the total capacity 204 represents an effective density of a memory device (e.g., a 64 GB SD card may have an effective density of 62 GB, a 16 GB SD card may have an effective density of 15 GB, etc.). The effective density of a memory device may be less than an overall total amount of memory due to creation and management of reserve memory (e.g., replacement blocks that are called upon in response to a failed block), storage of memory controller firmware, storage of register space, etc. In some implementations, the total capacity 204 is a dynamically configurable setting, in which the reference value can be modified in response to handshaking between a host device 104 and the memory device 102. Thus, the total capacity 204 can be reduced to allocate new reserve memory blocks if previously reserved memory blocks were called upon in response to failures or errors. In eMMC, the controller 106 can be configured to implement a "Dynamic Capacity" feature that enables a host device to dynamically reduce the density provided by the memory device (e.g., the memory device releases blocks of memory from the second region of memory).

In another example, an actual characteristic can represent a capacity of an individual portion 206 of the memory (e.g., a primary partition, a physical partition) or an individual region of the memory (e.g., one or more portions, a part of a portion, etc.). Therefore, each portion of the memory may be associated with one or more individual settings and one or more individual elements storing corresponding values.

In yet another example, an actual characteristic can represent a start address of an individual portion or an individual region 208 of the memory.

In a further example, an actual characteristic can represent an alignment of start addresses of individual portion(s) and/or individual region(s) 210 of the memory. Aligning with memory page sizes and/or memory block sizes improves performance of the memory device and extends a life of the memory device.

In even a further example, an actual characteristic can represent a size of an allocation unit of an individual portion 212 of the memory. Aligning the size the cluster used by the host file system with the allocation unit by the memory device improves the performance of the memory device.

Figure 4:
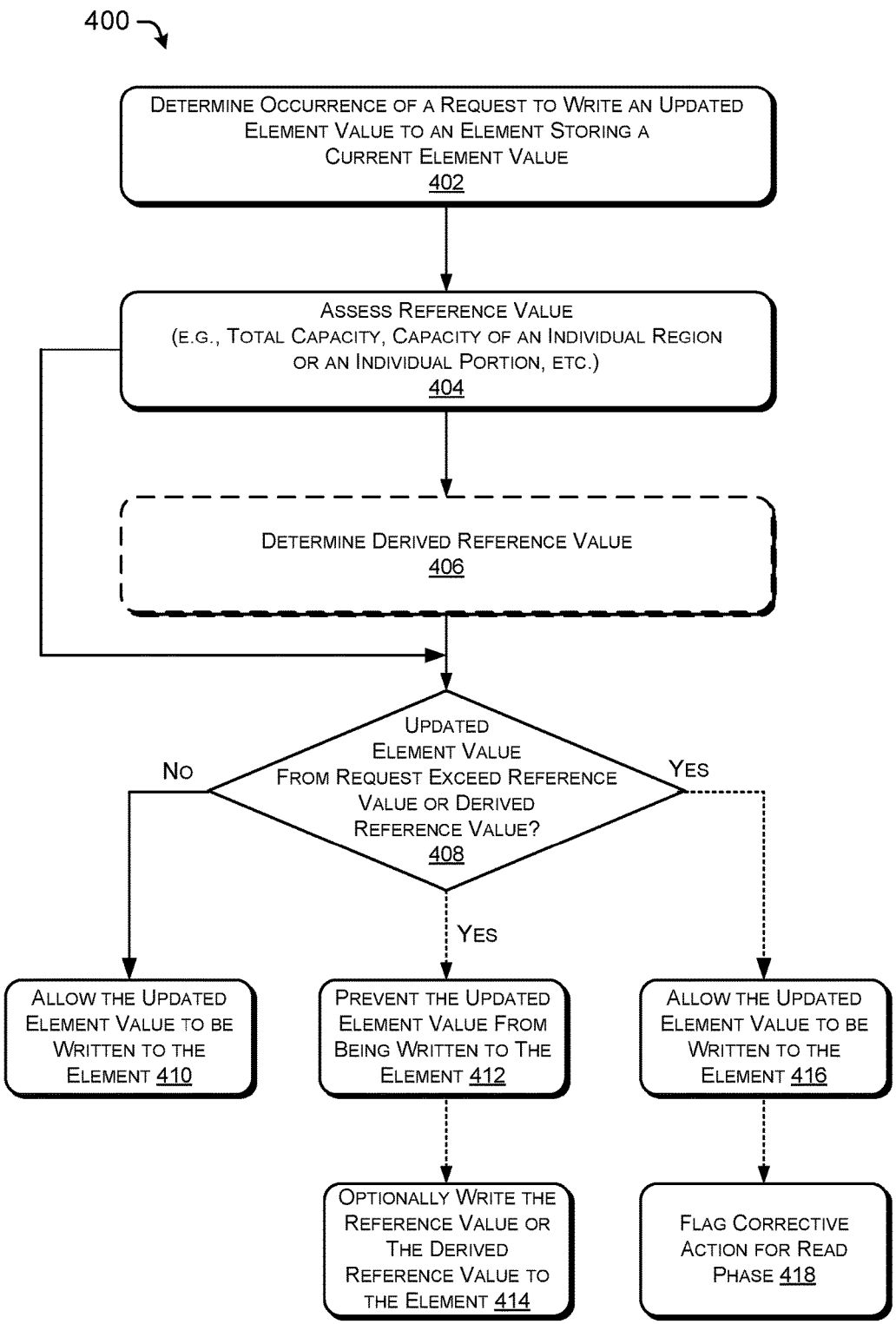
FIG. 4 illustrates an example process that assesses a reference value, or a derived reference value, to ensure that a write action associated with an element storing a value is valid or to ensure that the value stored in the element is valid. The example process can be implemented by a memory device.
Figure 5:
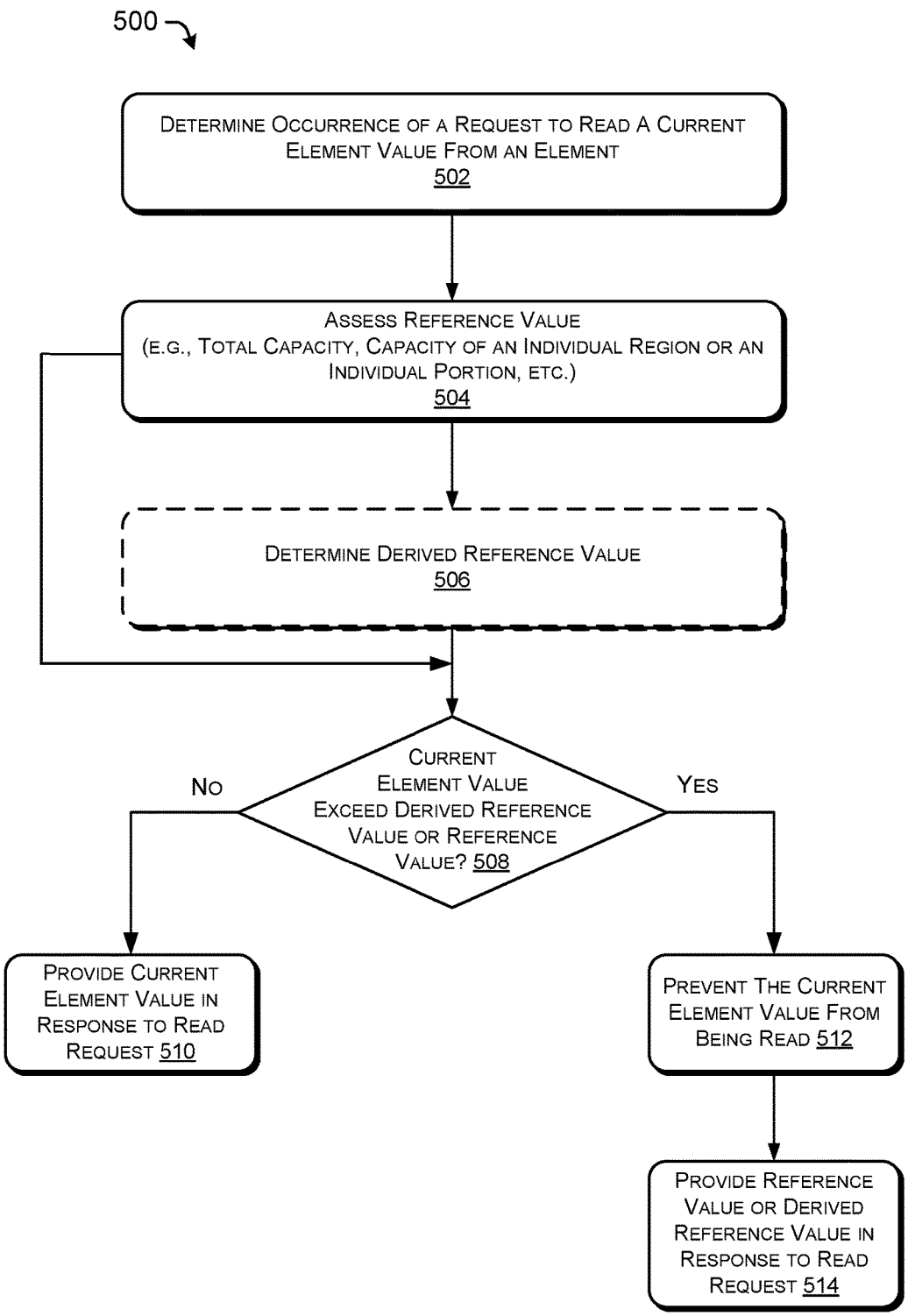
FIG. 5 illustrates an example process that assesses a reference value, or a derived reference value, to ensure that a read action associated with an element storing a value is valid or to ensure that the value stored in the element is valid. The example process can be implemented by a memory device.

The example processes described herein in FIGS. 3-5 are illustrated as logical flow graphs, which represent a sequence of operations that can be implemented in hardware, software, or a combination thereof. The operations may represent executable instructions that, when executed by one or more processors, perform the recited operations. Executable instructions may include routines, programs, objects, components, modules, data structures, and the like that perform particular functions. The order in which the operations are depicted in FIGS. 3-5 is not intended to be construed as a limitation, and any number of the described operations can be combined in any order and/or in parallel to implement the process. The executable instructions may be stored on non-transitory computer storage media including volatile and non-volatile, removable and non-removable media implemented in any method or technology for storage of information such as computer readable instructions, data structures, program modules, or other data. Computer storage media includes, but is not limited to, random-access memory (RAM), read-only memory (ROM), electrically erasable programmable read-only memory (EEPROM), flash memory or other memory technology, magnetic storage devices, or any other non-transmission medium that can be used to store information for access by a host device or by a memory device.

FIG. 3 illustrates an example process 300 that monitors for an occurrence of an action associated with an element storing a value and that ensures that the action is valid. The example process 300 can be implemented by a memory device 102 (e.g., the controller 106 of the memory device 102) in the context of FIG. 1 and/or FIG. 2.

At 302, a memory device monitors for an occurrence of an action associated with an element (or elements) that individually store a value indicative of a characteristic related to the memory device, the memory of the memory device or operation of the memory device. As discussed above, the action can be a read request from a host device or a write request from the host device. In various implementations, the element that stores the value is stored in a region of the memory (e.g., the first region of memory 108 in FIGS. 1 and 2) that is used for storing metadata 110 (e.g., partitioning metadata, data related to system structures of the memory device, etc.). The element can be associated with a known address that is visible to the host device. Consequently, a value currently stored in the element can be modified by the host device (e.g., can be controlled by a counterfeiter) so that it incorrectly or inaccurately reflects an actual characteristic of the memory device.

At 304, the memory device determines whether the action associated with the element is valid compared to a reference value associated with an actual characteristic. In various implementations, the reference value is stored in a setting located in a region of memory (e.g., the third region of memory 120 in FIGS. 1 and 2) that is separate from the region of memory in which the element is located. The setting located in this region of memory can comprise a register, a descriptor, an attribute, a flag, etc. In this region of memory, the reference value can be read but the reference value (i) cannot be re-programmed after the memory device is manufactured (e.g., the setting is one-time programmable), (ii) can only be re-programmed or altered in control of the memory device and not in control of a host device (e.g., a dynamic capacity adjustment initiated and controlled by the memory device), or (iii) can require authentication of a host device if the reference value is to be modified. Accordingly, the reference value is a true value that correctly and accurately reflects an actual characteristic of the memory device.

In various examples, an action associated with an element that stores a value is valid if the value to be written to the element (e.g., by a host device), if the value eventually written to the element (e.g. by the memory controller), or if a value that remains stored in the element, is valid compared to a reference value (e.g., is less than the reference value). In various examples, an action associated with an element that stores a value is valid if the value being read from the element is valid compared to a reference value or if a valid value is being delivered to the host device based on a reference value.

At 306, the memory device implements a corrective action if the action associated with the element is determined to be invalid. For instance, the corrective action may prevent (i) a value currently stored in the element from being read out from the element or (ii) an updated value received from a host device from being written to the element if the updated value is an invalid value (e.g., the updated value represents a capacity that exceed a capacity represented by the reference value). Otherwise (if the action associated with the element is determined to be valid), the memory device completes the action. For instance, the memory device returns the current value stored in the element in response to a read request or the memory device writes the updated value to the element in response to a write request (e.g., the updated value written replaces the current value stored in the element).

FIG. 4 illustrates an example process 400 that assesses a reference value, or a derived reference value, to ensure that a write action associated with an element storing a value is valid. The example process 400 can be implemented by a memory device 102 (e.g., the controller 106 of the memory device 102) in the context of FIG. 1 and/or FIG. 2.

At 402, the memory device determines an occurrence of a request to write an updated element value to an element that stores a current element value. For instance, the request may be initiated by a host device attempting to write, to the metadata 110 of the first region of memory 108, a new value indicative of a capacity of the memory device.

At 404, the memory device assesses a reference value. As discussed above, the reference value is stored in a setting that corresponds to the element in which the current element value is stored, and thus, the reference value is related to the current element value. The setting is located in a region of the memory that is separate from where the element is stored. Accordingly, the memory device can access the reference value in this separate region. The reference value can reflect a total capacity of the memory device, a capacity of an individual portion of memory, a start address of a portion or region of memory, etc.

In some implementations, at 406, the memory device can determine a derived reference value. For example, to determine a capacity of a primary partition within a physical partition, the memory device subtracts the amount of memory used to store the metadata 110 within the physical partition (e.g., a size of the first region of memory 108) from the capacity of the physical partition (e.g., as indicated by the reference value). Thus, the derived reference value can be derived (e.g., calculated) by subtracting a size of the first region of memory from a size of a capacity of a portion of memory in the memory device (e.g., a physical partition).

In another example, to determine a capacity of a particular primary partition of multiple primary partitions (e.g., at least two) within a physical partition, the memory device subtracts both (i) the amount of memory used to store the metadata 110 within the physical partition (e.g., a size of the first region of memory 108) and (ii) the size of other primary partitions within the physical partition, from the capacity of the physical partition (e.g., as indicated by the reference value). Thus, the derived reference value for the particular primary partition can be derived (e.g., calculated) by subtracting both a size of the first region of memory and a size of other primary partitions within the physical partition, from a size of the capacity of the physical partition.

In various implementations, the physical partition described in either of the two preceding paragraphs may be one of multiple physical partitions that comprise the memory of the memory device. After deriving the derived reference value, the process moves to 408.

Alternatively, the operation associated with 406 can be skipped (e.g., as illustrated by the arrow around 406) in instances where the reference value does not need to be derived prior to a comparison (e.g., the reference value stored in a setting is already a result of a subtraction of a size of the first region of memory from the capacity of a portion of memory in the memory device).

At decision 408, the memory device determines whether the updated element value from the request exceeds the reference value or the derived reference value (e.g., indicating that the host device is attempting to write a value that is outside the operational boundaries of the memory device or the host device is attempting to write a value that is not optimum for operation of the memory device). For instance, the determination can be made based on a comparison.

If the answer at decision 408 is "No", then the process moves to 410 where the memory device allows the updated element value to be written to the element in response to receiving the request to write from the host (e.g., the action is valid and/or the updated element value to be written is valid).

In a first example, if the answer at decision 408 is "Yes", then the process moves to 412 where the memory device prevents the updated element value from being written to the element (i.e., the action is invalid because, for example, the host device is trying to write a counterfeit value to the metadata—~64 GB for the capacity of a primary partition instead of the actual ~16 GB of capacity of the primary partition). In some instances, at 414, the memory device can optionally write the reference value or the derived reference value to the element instead of writing the updated element value received from the host device in association with the write request. In some instances, a valid value may pre-exist in the element, and thus, the valid value does not need to be updated at all.

In a second example, if the answer at decision 408 is "Yes", then the process moves to 416 where the memory device allows the updated element value to be written to the element even though the action has been determined to be invalid and/or the updated element value has been determined to be invalid. However, at 418, the memory device may internally flag the element so that a corrective action is associated with any reading of the current value stored in the flagged element (e.g., the current value being a counterfeit value based on the updated element value written by the host device). For example, when an attempt to read from the flagged element occurs, the memory device does not provide the counterfeit value (e.g., the invalid value) currently stored in the flagged element, but rather, the memory device implements a corrective action to protect the integrity of the memory device (e.g., the memory device may access and provide a corresponding reference value or a derived reference value during a read phase).

FIG. 5 illustrates an example process 500 that assesses a reference value, or a derived reference value, to ensure that a read action associated with an element storing a value is valid. The example process 500 can be implemented by a memory device 102 (e.g., the controller 106 of the memory device 102) in the context of FIG. 1 and/or FIG. 2.

At 502, the memory device determines an occurrence of a request to read a current element value (currently) stored in an element. For instance, the request may be initiated by a host device attempting to read information (e.g., a capacity of a primary partition of the memory device) from the metadata 110 of the first region of memory 108.

At 504, the memory device assesses a reference value. As discussed above, the reference value is stored in a setting that corresponds to the element in which the current element value is stored, and thus, the reference value is related to the current element value. The setting is located in a region of the memory that is separate from where the element is stored. Accordingly, the memory device can access the reference value in this separate region. The reference value can reflect a total capacity of the memory device, a capacity of an individual portion of memory, a start address of a portion or region of memory, etc.

In some implementations, at 506, the memory device can determine a derived reference value. For example, to determine the capacity for a primary partition within a physical partition, the memory device subtracts the amount of memory used to store the metadata 110 within the physical partition (e.g., a size of the first region of memory 108) from the capacity of the physical partition (e.g., as indicated by the reference value). Thus, the derived reference value can be derived (e.g., calculated) by subtracting a size of the first region of memory from a size of a capacity of a portion of memory in the memory device (e.g., a physical partition).

In another example, to determine a capacity of a particular primary partition of multiple primary partitions (e.g., at least two) within a physical partition, the memory device subtracts both (i) the amount of memory used to store the metadata 110 within the physical partition (e.g., a size of the first region of memory 108) and (ii) the size of other primary partitions within the physical partition, from the capacity of the physical partition (e.g., as indicated by the reference value). Thus, the derived reference value for the particular primary partition can be derived (e.g., calculated) by subtracting both a size of the first region of memory and a size of other primary partitions within the physical partition, from a size of the capacity of the physical partition.

In various implementations, the physical partition described in either of the two preceding paragraphs may be one of multiple physical partitions that comprise the memory of the memory device. After deriving the derived reference value, the process moves to 508.

Alternatively, the operation associated with 506 can be skipped (e.g., as illustrated by the arrow around 506) in instances where the reference value does not need to be derived prior to a comparison (e.g., the reference value stored in a setting is already a result of a subtraction of a size of the first region of memory from the capacity of a portion of memory in the memory device).

At decision 508, the memory device determines whether the current element value already stored in the element exceeds the reference value or the derived reference value (e.g., indicating that the host device is attempting to read a value that is outside the operational boundaries of the memory device). For instance, the determination can be made based on a comparison.

If the answer at decision 508 is "No", then the process moves to 510 where the memory device provides the current element value to the host device in response to receiving the request to read from the host (e.g., the action is valid and/or the current element value is valid).

If the answer at decision 508 is "Yes", then the process moves to 512 where the memory device prevents the current element value from being read out to the host device (e.g., the action and/or the current element value is invalid because, for example, the host device is reading a counterfeit value from the metadata—~64 GB for the capacity of a primary partition instead of the actual ~16 GB of capacity of the primary partition).

At 514, the memory device provides the reference value or the derived reference value to the host device instead of the current element value.

Figure 6:
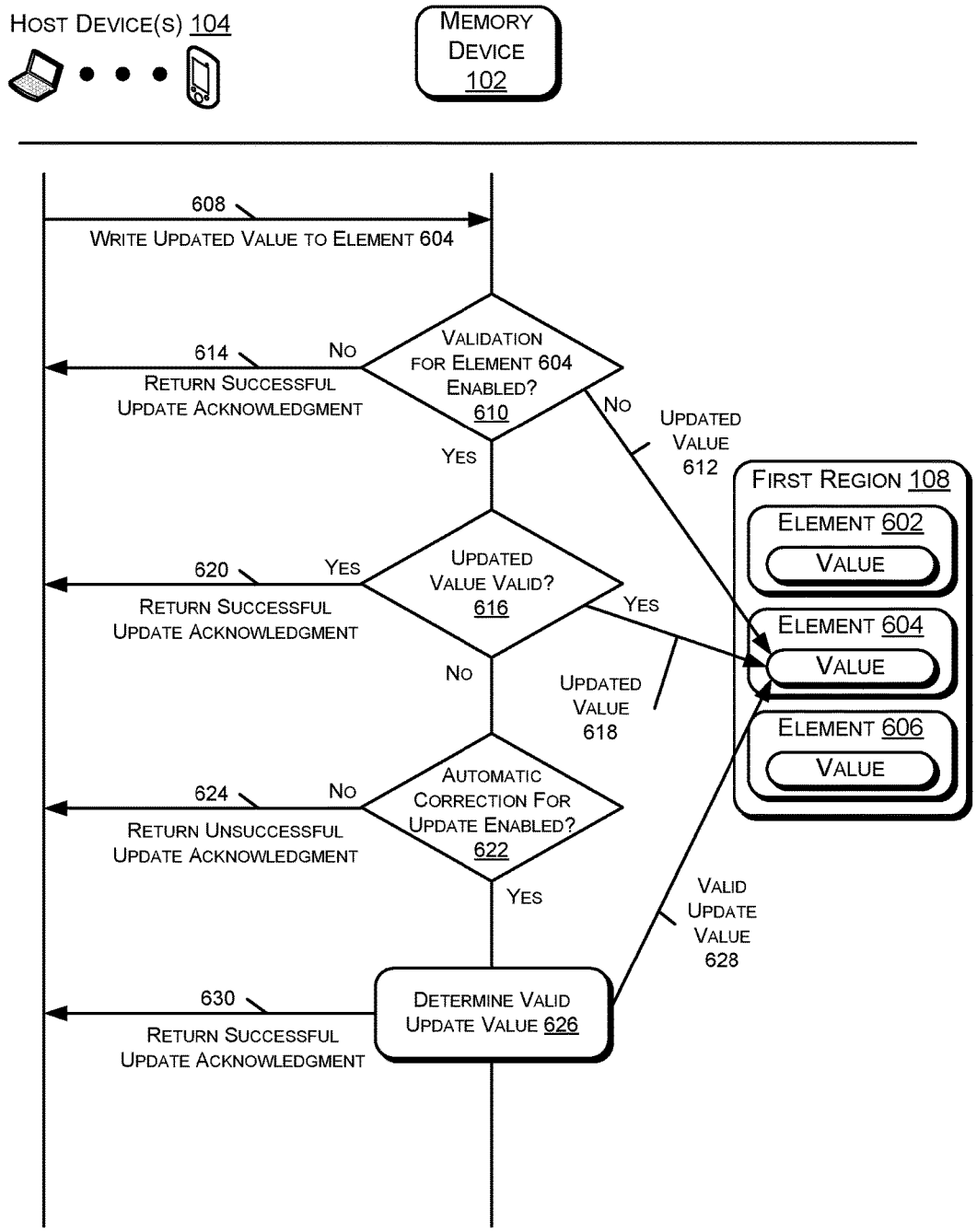
FIG. 6 illustrates example interactions implemented between a host device and a memory device to ensure that (i) a write action by the host device is valid or (ii) that a current value already stored in an element is valid.

FIG. 6 illustrates example interactions implemented between a host device 104 and a memory device 102 to ensure that (i) a write action by the host device is valid or (ii) that a current value already stored in an element is valid. The example interactions of FIG. 6 can be implemented in the context of FIG. 1 and/or FIG. 2.

FIG. 6 illustrates the first region of memory 108 (from FIG. 1). The first region of memory 108 includes a first element 602 that stores a value, a second element 604 that stores a value, and a third element 606 that stores a value. While FIG. 6 shows three different elements, it is understood that the metadata 110 can include any number of elements that store values indicative of characteristics of the memory device.

At interaction 608, the host device 104 requests to write an updated element value to element 604 and the memory device 102 receives the request to write the updated element value to element 604.

At decision 610, the memory device 102 determines if validation for an action associated with element 604 is enabled. For example, the memory device 102 can access a setting (e.g., a register, an attribute, etc.) in the third region of the memory 120 that indicates that validation associated with element 604 is enabled or disabled. The setting that indicates that validation is enabled or disabled can be separate from the setting that stores a reference value used to determine if the action associated with element 604 is valid or invalid.

If the answer to decision 610 is "No" (e.g., validation is disabled), then at 612, the memory device 102 writes the updated element value received from the host device 104 to element 604 without validating the write request and/or the updated element value, and at interaction 614, the memory device 102 returns a successful update acknowledgement to the host device 104.

If the answer to decision 610 is "Yes" (e.g., validation is enabled), then at decision 616, the memory device 102 determines if the updated element value received from the host device 104 and that is to be written to element 604 is valid. For example, the memory device 102 can implement the comparison associated with 408 in the example process 400 of FIG. 4.

If the answer to decision 616 is "Yes", then at 618, the memory device 102 writes the updated element value received from the host device 104, and determined to be valid, to element 604 because the action is valid, and at interaction 620, the memory device 102 returns a successful update acknowledgement to the host device 104.

If the answer to decision 616 is "No", then at decision 622, the memory device 102 determines whether automatic correction for the write/update is enabled (e.g., to correct the invalid action and the invalid updated element value). For example, the memory device 102 can access another setting (e.g., a register, an attribute, etc.) in the third region of the memory 120 that indicates whether automatic correction of an invalid action associated with element 604 is enabled or disabled. The setting that indicates that automatic correction is enabled or disabled can also be separate from the setting that stores a reference value used to determine if the action associated with element 604 is valid or invalid.

If the answer to decision 622 is "No", then at interaction 624, the memory device 102 returns an unsuccessful update acknowledgement to the host device 104, and the current value stored in element 604 is not updated because the write action has been determined to be invalid.

If the answer to decision 622 is "Yes", then at 626, the memory device 102 determines a valid update value (e.g., a reference value or a derived reference value as discussed above). Then, at 628, the memory device 102 writes the valid update value to element 604 instead of the updated element value received from the host device 104, and at interaction 630, the memory device 102 returns a successful update acknowledgement to the host device 104.

Figure 7:
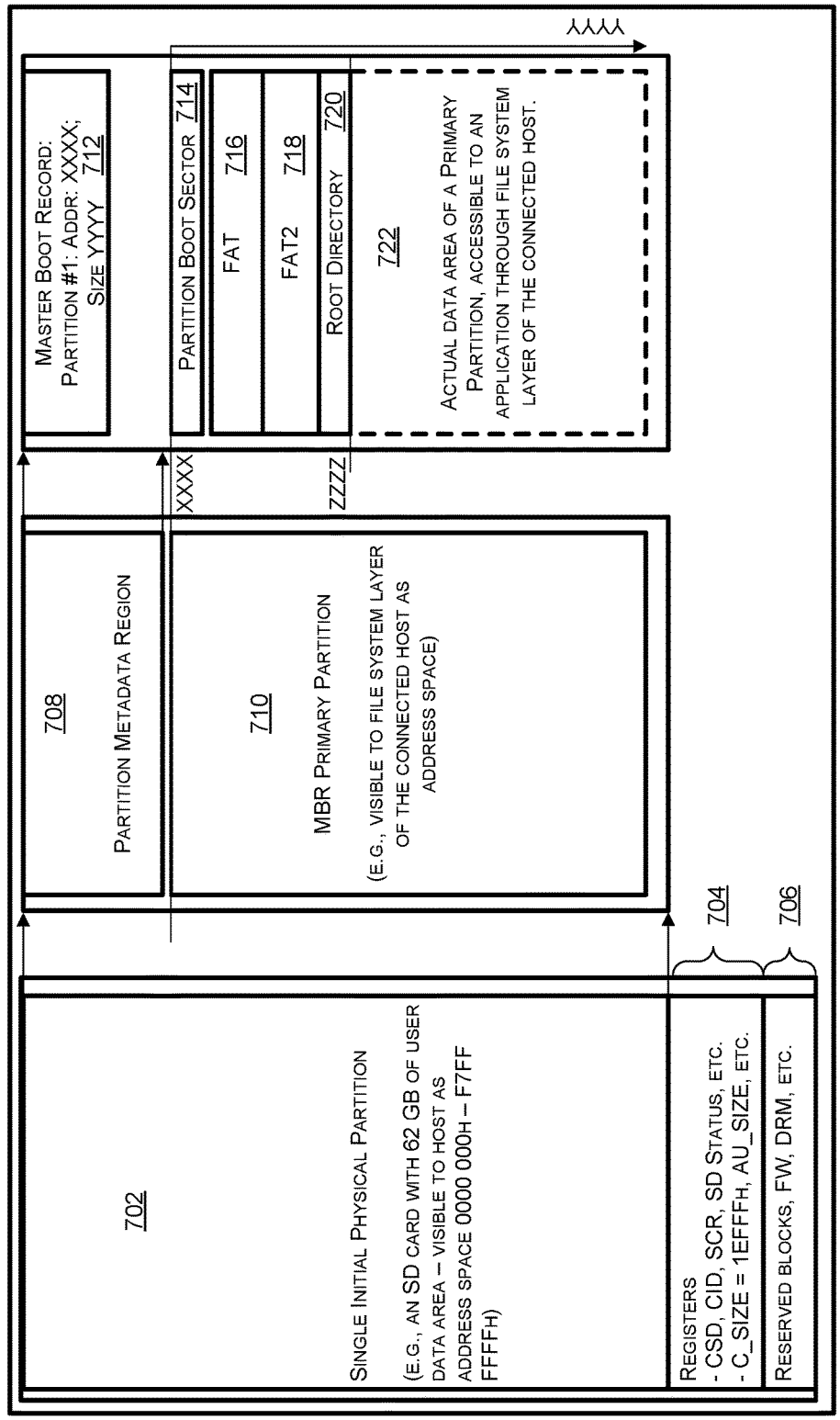
FIG. 7 illustrates an example memory device (e.g., an SD card) in which the techniques described herein can be implemented.

FIG. 7 illustrates an example memory device (e.g., an SD card) in which the techniques described herein can be implemented. FIG. 7 illustrates a single physical partition 702 (e.g., the "Single Initial Physical Partition") that implements Master Boot Record (MBR) partitioning and a File Allocation Table (FAT) file system. In this example, the single physical partition includes ~62 GB of memory space (e.g., may also be referred to as "user data area" in association with an SD card) that is visible to a host device and/or a user of the host device, for example, via address space 0000 0000h through F7FF FFFFh. The single physical partition 702 comprises a portion of memory as described above.

FIG. 7 also illustrates memory region 704 for registers (e.g., CSD, CID, SCR, SD Status, C_Size, AU_Size, etc.) and memory region 706 for reserved blocks, firmware (FW), digital rights management (DRM), etc. The memory region 704 may be associated with the third region of memory 120, as described above with respect to FIG. 1. The SD card illustrated in the example of FIG. 7 comprises a 64 GB SD card, and the ~62 GB of the single physical partition 702 is the total capacity of the SD card that is visible to a host device after the memory region 704 and the memory region 706 is subtracted from 64 GB.

FIG. 7 further illustrates the single physical partition 702 in greater detail. For instance, the single physical partition 702 includes a partition metadata region 708 and an MBR primary partition 710 that starts at address XXXX. The partition metadata region 708 may be associated with the first region of memory 108, as described above with respect to FIG. 1. Moreover, the MBR primary partition 710 may be associated with the second region of memory 116, as described above with respect to FIG. 1, and therefore, the MBR primary partition 710 is visible to a file system layer of a connected host device.

In various examples, the host device may implement a read or a write action associated with an element in the partition metadata region 708 that stores a value representative of a capacity (e.g., a size) of the MBR primary partition 710 (as represented by YYYY in FIG. 7). The action may be an action implemented by a counterfeiter that targets the element in the partition metadata region 708 (e.g., attempts to write a false value). As described above, a register setting in the memory region 704 stores a reference value (e.g., a true value) that can be indicative of (i) a capacity of the initial physical partition 702 or (ii) a capacity of the MBR primary partition 710. The memory device can then use the techniques described above to ensure that reading the value from, or writing the value to, the element in the partition metadata region 708 is valid compared to the reference value stored in the register setting in the memory region 704. For example, the memory device can compare a value to be read or written directly to the reference value if the reference value is indicative of the capacity of the MBR primary partition 710. In another example, the memory device can derive a derived reference value by subtracting a size of the partition metadata region 708 from the capacity of the single physical partition (e.g., as indicated by the reference value) so that the derived reference value indicates the true capacity of the MBR primary partition 710 (as represented by YYYY in FIG. 7). In some instances, the memory device may have to further subtract a size of potential out-of-partition space (e.g., alignment overhead) to derive the true capacity of the MBR primary partition 710. It may also be considered adequate enough to compare the value to be written to a reference value which indicates the size of the physical partition.

FIG. 7 provides even further details of the partition metadata region 708 and the MBR primary partition 710. For example, the partition metadata region 708 may contain a Master Boot Record 712 (e.g., one or more "elements" as described above) storing information representing a start address (e.g., "XXXX") and a size (e.g., "YYYY") of the MBR primary partition 710. In another example, the MBR primary partition 710 may contain a partition boot sector 714, a first file allocation table (FAT) 716, a second FAT 718, a root directory 720, and an actual data area of a primary partition 722 that is accessible to an application through the file system layer of a connected host device.

Figure 8:
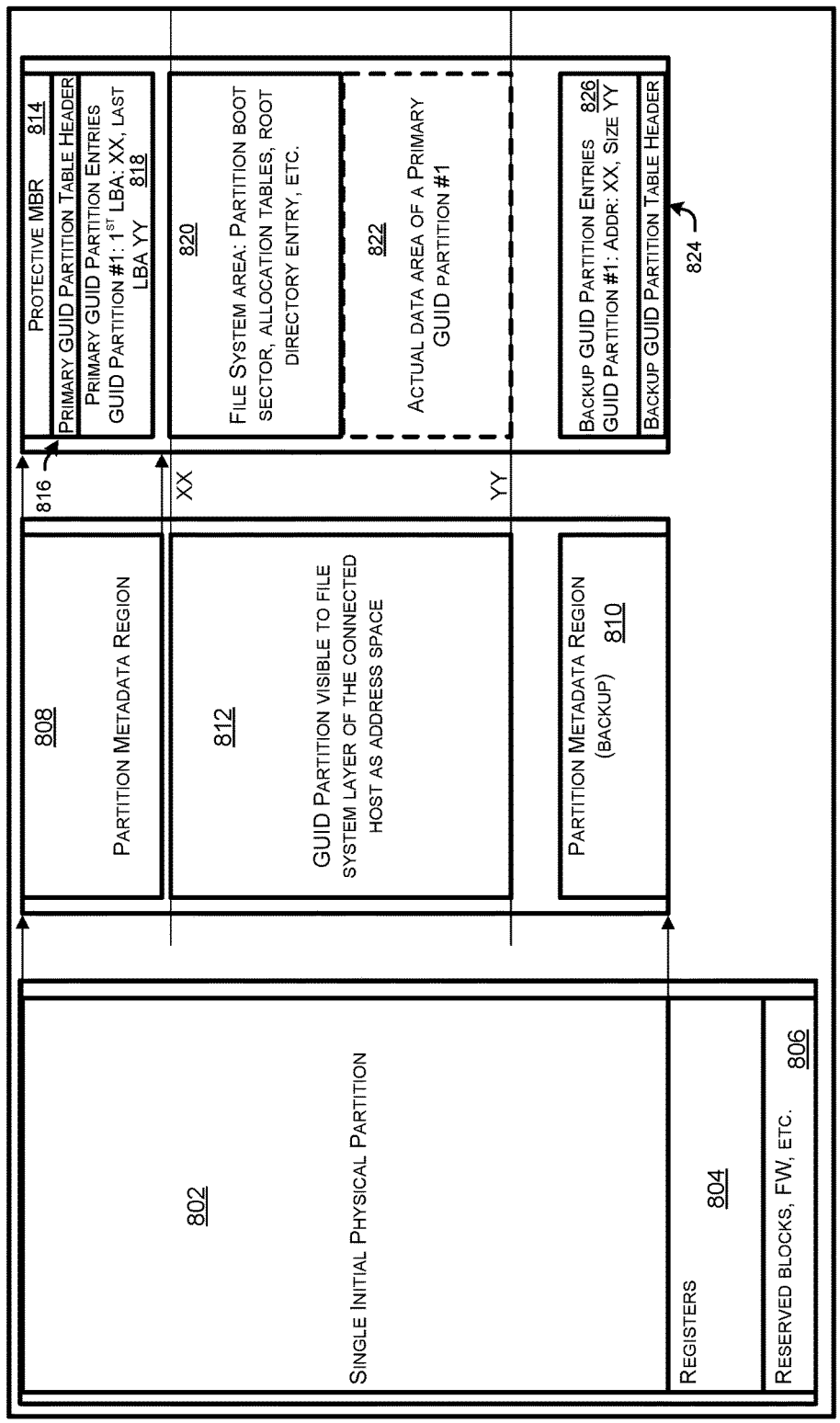
FIG. 8 illustrates an example memory device in which the techniques described herein can be implemented.

FIG. 8 illustrates an example memory device in which the techniques described herein can be implemented. FIG. 8 illustrates a single physical partition 802 (e.g., the "Single Initial Physical Partition") that implements that implements GUID Partition Table (GPT) partitioning and a FAT file system. Similar to FIG. 7, in this example, the single physical partition 802 can include ~62 GB of memory space (e.g., NAND memory) that is visible to a host device and/or a user of the host device. The single physical partition 802 comprises a portion of memory as described above.

FIG. 8 also illustrates memory region 804 for registers and memory region 806 for reserved blocks, firmware (FW), etc. The memory region 804 may be associated with the third region of memory 120, as described above with respect to FIG. 1.

FIG. 8 further illustrates the single physical partition 802 in greater detail. For instance, the single physical partition 802 includes a first partition metadata region 808, a second partition metadata region 810 (for backup), and a GUID partition 812 that starts at address XX and ends at address YY (e.g., where XX and YY are a logical block address (LBA)). The first partition metadata region 808 and the second partition metadata region 810 may individually be associated with a first region of memory 108, as described above with respect to FIG. 1. Moreover, the GUID partition 812 may be associated with the second region of memory 116, as described above with respect to FIG. 1, and therefore, the GUID partition 812 is visible to a file system layer of a connected host device.

In various examples, the host device may implement a read or a write action associated with an element in the partition metadata region 808 that stores a value representative of a capacity (e.g., a size) of the GUID partition 812 (based on start address XX and end address YY in FIG. 8). The action may be an action implemented by a counterfeiter that targets the element in the partition metadata region 808 (e.g., attempts to write a false value). As described above, a register setting in the memory region 804 stores a reference value (e.g., a true value) that can be indicative of (i) a capacity of the initial physical partition 802 or (ii) a capacity of the GUID partition 812. The memory device can then use the techniques described above to ensure that reading the value from, or writing the value to, the element in the partition metadata region 808 is valid compared to the reference value stored in the register setting in the memory region 804. For example, the memory device can compare a value to be read or written directly to the reference value if the reference value is indicative of the capacity of the GUID partition 812. In another example, the memory device can derive a derived reference value by subtracting a size of the partition metadata region 808 and a size of the partition metadata region 810 from the capacity of the single physical partition 802 (e.g., as indicated by the reference value) so that the derived reference value indicates the true capacity of the GUID partition 812. In some instances, the memory device may have to further subtract a size of potential out-of-partition space (e.g., alignment overhead) to derive the true capacity of the GUID partition 812.

FIG. 8 provides even further details of the first partition metadata region 808, the second partition metadata region 810, and the GUID partition 812. For example, the first partition metadata region 808 may contain a protective Master Boot Record (MBR) 814, a primary GUID partition table header 816, and primary GUID partition entries 818 (e.g., one or more "elements" as described above) storing information representing a start address (e.g., "XX") and a last address (e.g., "YY") of the GUID partition 812. In another example, the GUID partition 812 may contain (i) a file system area 820 that contains a partition boot sector, allocation tables, a root directory entry, etc., and (ii) an actual data area 822 of the primary GUID partition 812 that is accessible to an application through the file system layer of a connected host device. In yet another example, the second partition metadata region 810 may contain a backup GUID partition table header 824 and backup GUID partition entries 826.

Figure 9:
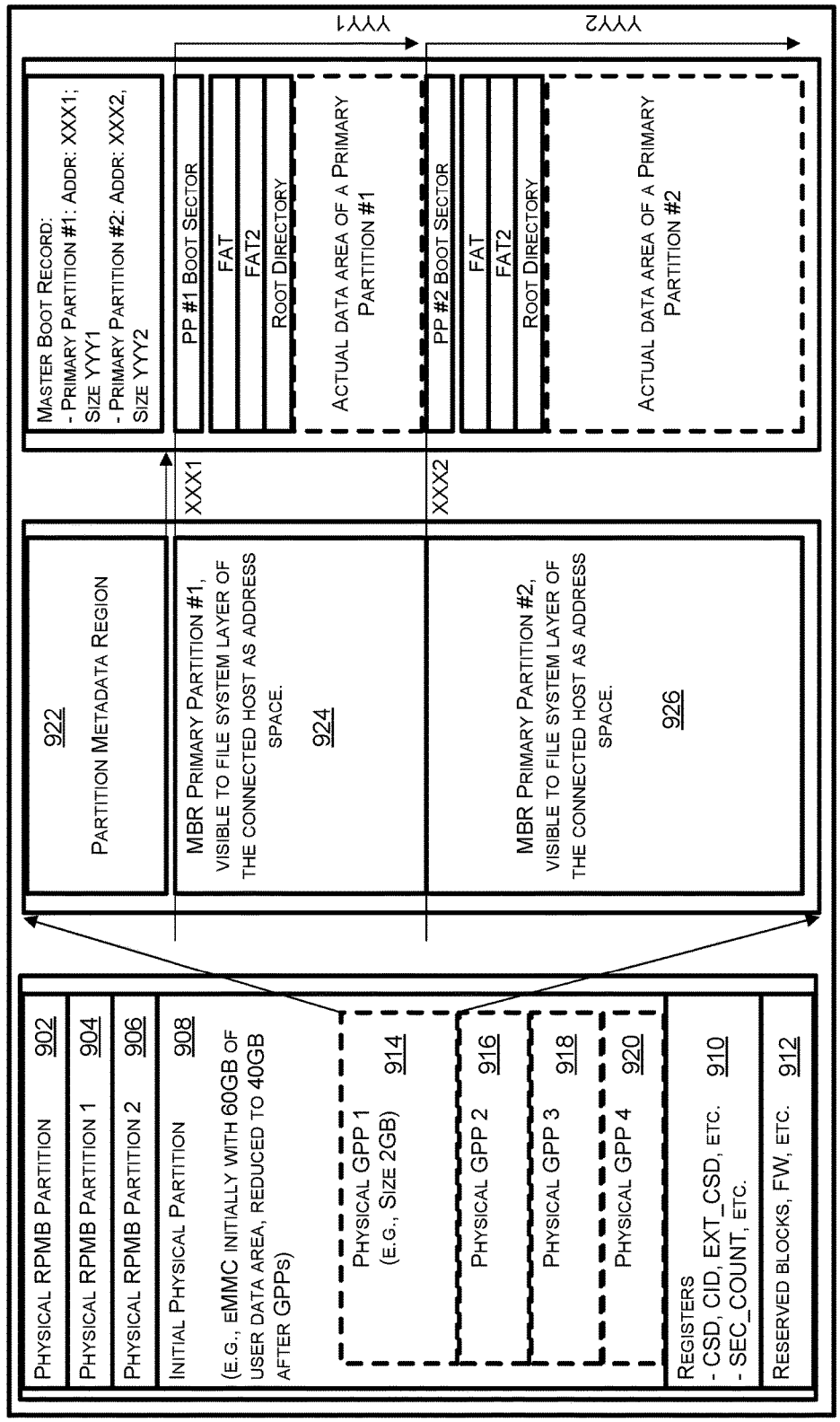
FIG. 9 illustrates an example memory device (e.g., eMMC) in which the techniques described herein can be implemented.

FIG. 9 illustrates an example memory device (e.g., eMMC) in which the techniques described herein can be implemented. FIG. 9 illustrates multiple physical partitions and multiple primary partitions that can individually implement MBR partitioning and a FAT file system.

For example, the eMMC memory device in FIG. 9 includes a physical replay protected memory block (RPMB) partition 902, a first physical boot partition 904, a second physical boot partition 906, and an initial physical partition 908. In this example, the initial physical partition 908 includes ~60 GB of memory space (e.g., may also be referred to as "user data area" in association with eMMC) that is visible to a host device and/or a user of the host device.

FIG. 9 also illustrates memory region 910 for registers (e.g., CSD, CID, EXT_CSD, SEC_Count, etc.) and memory region 912 for reserved blocks, firmware (FW), etc. The memory region 910 may be associated with the third region of memory 120, as described above with respect to FIG. 1.

In this example, the initial physical partition 908 can be divided into a number of physical general purpose partitions (GPPs). For instance, space can be allocated to each of a first physical GPP 914, a second physical GPP 916, a third physical GPP 918, and a fourth physical GPP 920, thereby creating five physical partitions that comprise the user data area—the remaining space of the initial physical partition 908, as well as the first physical GPP 914, the second physical GPP 916, the third physical GPP 918, and the fourth physical GPP 920. A size of a physical GPP is configurable, and thus, may vary from one physical GPP to the next (e.g., the size of the first physical GPP 914 may be 2 GB, the size of the second physical GPP 916 may be 4 GB, a size of the third physical GPP 918 may be 8 GB, etc.). To this end, an eMMC with 60 GB of initial user data area may have the user data area reduced to ~40 GB after the physical GPPs are configured, as referenced in FIG. 9.

For ease of discussion, FIG. 9 illustrates the first physical GPP 914 in greater detail. For instance, the first physical GPP 914 includes a partition metadata region 922, a first MBR primary partition 924 that starts at address XXX1, and a second MBR primary partition 926 that starts at address XXX2. The partition metadata region 922 may be associated with the first region of memory 108, as described above with respect to FIG. 1. Moreover, the first MBR primary partition 924 and the second MBR primary partition 926 may be associated with the second region of memory 116, as described above with respect to FIG. 1, and therefore, each of the first MBR primary partition 924 and the second MBR primary partition 926 is visible to a file system layer of a connected host device.

In various examples, the host device may implement a read or a write action associated with an element in the partition metadata region 922 that stores a value representative of a capacity (e.g., a size) of the first MBR primary partition 924 (as represented by YYY1 in FIG. 9). The action may be an action implemented by a counterfeiter that targets the element in the partition metadata region 922 (e.g., attempts to write a false value). As described above, a register setting in the memory region 910 stores a reference value (e.g., a true value) that can be indicative of (i) a capacity of the first physical GPP 914 or (ii) a capacity of the first MBR primary partition 924. The memory device can then use the techniques described above to ensure that reading the value from, or writing the value to, the element in the partition metadata region 922 is valid compared to the reference value stored in the register setting in the memory region 910. For example, the memory device can compare a value to be read or written directly to the reference value if the reference value is indicative of the capacity of the first MBR primary partition 924. In another example, the memory device can derive a derived reference value by first subtracting a size of the partition metadata region 922 from the capacity of the first physical GPP 914 (e.g., as indicated by the reference value) and then subtracting sizes of other primary partitions (e.g., the second MBR primary partition 926 as indicated by YYY2 in FIG. 9) so that the derived reference value indicates the true capacity of the first MBR primary partition 924 (as represented by YYY1 in FIG. 9). In some instances, the memory device may have to further subtract a size of potential out-of-partition space (e.g., alignment overhead) to derive the true capacity of the first MBR primary partition 924.

FIG. 9 provides even further details of the partition metadata region 922 and the MBR primary partitions 924 and 926. For example, the partition metadata region 922 may contain a Master Boot Record (e.g., one or more "elements" as described above) storing information representing start addresses (e.g., "XXX1" and "XXX2") and sizes (e.g., "YYY1" and "YYY2") of the MBR primary partitions 924 and 926. In another example, each of MBR primary partitions 924 and 926 may contain a primary partition boot sector, a first file allocation table (FAT), a second FAT, a root directory, and an actual data area that is accessible to an application through the file system layer of a connected host device.

According to yet another alternative implementation, the memory device can compare an element value (or an updated element value which a host device attempts to write) not only to a reference or a derived reference value but also to another element value (or values). This can ensure that element values that are associated with, or that define, same characteristics of the memory device in different ways store converging values. As an example, a size of a primary partition may be represented in the MBR in two ways: by a cylinder, head sector (CHS) method or by a logical block address (LBA) method. In this case, the memory device can consider one of the methods (one or more elements) as a secondary reference (in addition to the reference in the third region) and the memory device can keep the values stored in, or indicated by, the elements (i.e. different methods) converged according to methods described in this application.

In some instances, a reference value may be a single value (e.g., 0Fh, 16d, 0000 1111b), a set of values (e.g., 02h, 0Ah, 0Fh), a range of values (e.g., 02h-0Ah), or any combination of these, as described herein. An action being valid may mean that the comparison to a reference value is one of equal to (e.g., read/written value to an element is equal to the reference value), different from, smaller than, greater to, within a range, out of range, one or more in the set of values, out of set of values, multiple of, or any combination of these actions, as described herein.

In some instances, a derived reference value may be result of, for example, a function of one or more reference values, a function of one of more updated element values, or a function of one or more current element values. For example, a derived value may include, but is not limited to, a reference value subtracted by a capacity of memory (e.g., a size of a region of memory), a reference value added by a second value, or an updated element value being masked with a reference value.

In some instances, an action comprises a request, from a host device, to read a current element value from an element. Further operations may include preventing, by the (memory) controller, the reading out of the current element value to the host device, and providing the reference value (or derived reference value) instead of the current element value to the host device, in response to receiving the request to read the current element value to ensure that that the request to read the current element value is valid.

Example Clauses

Example A, a memory device comprising: a memory comprising: a first region of the memory storing metadata including one or more elements to store one or more element values indicative of at least one characteristic related to a portion of the memory; and a second region of the memory storing data at least partly in the portion of the memory; and a controller configured to ensure that an action associated with an element of the one or more elements is valid compared to a reference value associated with an actual characteristic related to the portion of the memory.

Example B, the memory device of Example A, wherein the portion of the memory comprises at least one of: a primary partition, a physical partition, actual data area of a primary partition, or a logical unit.

Example C, the memory device of Example A, wherein an individual region of the memory comprises at least one of: a primary partition, a portion of a primary partition, a portion of a physical partition, file system metadata area of a primary partition, or a portion of a logical unit.

Example D, the memory device of any one of Example A through Example C, wherein the actual characteristic related to the portion of the memory is associated with one of: a total capacity of the memory device; a capacity of the first region of the memory and the second region of the memory combined; a capacity of the portion of the memory; a capacity of the second region of the memory; a start address of the portion or a region of the memory; an alignment of start addresses of the portion or a region of the memory; or a size of an allocation unit of the portion of the memory.

Example E, the memory device of any one of Example A through Example D, wherein: the element value comprises a current element value already stored in the element; the action comprises a request, from a host device, to write an updated element value to the element to replace the current element value already stored in the element; the actual characteristic related to the portion of the memory is associated with a capacity of the memory device; and the controller is further configured to: monitor for the request, from the host device, to write the updated element value to the element; assess the reference value; determine that the updated element value exceeds the reference value; and prevent the writing of the updated element value to the element.

Example F, the memory device of Example E, wherein the controller is further configured to write the reference value to the element instead of the updated element value in response to receiving the request to write the updated element value.

Example G, the memory device of any one of Example A through Example D, wherein: the element value comprises a current element value already stored in the element; the portion of the memory comprises a physical partition; the action comprises a request, from a host device, to write an updated element value to the element to replace the current element value already stored in the element; the actual characteristic related to the physical partition comprises a capacity of the physical partition; and the controller is further configured to: monitor for the request, from the host device, to write the updated element value to the element; assess the reference value; subtract a size of the first region of memory from the capacity of the physical partition to derive a derived reference value; determine that the updated element value exceeds the derived reference value; and prevent the writing of the updated element value to the element.

Example H, the memory device of Example G, wherein the controller is further configured to write the derived reference value to the element instead of the updated element value in response to receiving the request to write the updated element value.

Example I, the memory device of Example G or Example H, wherein the derived reference value represents a capacity of a single primary partition within the physical partition, and wherein the physical partition is one of one or more physical partitions that comprise the memory of the memory device.

Example J, the memory device of any one of Example A through Example D, wherein: the element value comprises a current element value already stored in the element, the current element value being associated with a primary partition; the portion of the memory comprises a physical partition; the action comprises a request, from a host device, to write an updated element value to the element to replace the current element value already stored in the element; the actual characteristic related to the physical partition comprises a capacity of the physical partition; and the controller is further configured to: monitor for the request, from the host device, to write the updated element value to the element; assess the reference value; subtract both a size of the first region of memory and a size of other primary partitions from the capacity of the physical partition to derive a derived reference value associated with the primary partition; determine that the updated element value exceeds the derived reference value; and prevent the writing of the updated element value to the element.

Example K, the memory device of any one of Example A through Example D, wherein: the element value comprises a current element value already stored in the element; the action comprises a request, from a host device, to read the current element value from the element; the actual characteristic related to the portion of the memory is associated with a capacity of the memory device; and the controller is further configured to: monitor for the request, from the host device, to read the current element value from the element; assess the reference value; determine that the current element value already stored in the element exceeds the reference value; prevent the reading out of the current element value to the host device; and provide the reference value instead of the current element value to the host device in response to receiving the request to read the current element value to ensure that that the request to read the current element value is valid.

Example L, the memory device of any one of Example A through Example D, wherein: the element value comprises a current element value already stored in the element; the portion of the memory comprises a physical partition; the action comprises a request, from a host device, to read the current element value from the element; the actual characteristic related to the physical partition comprises a capacity of the physical partition; and the controller is further configured to: monitor for the request, from the host device, to read the current element value from the element; assess the reference value; subtract a size of the first region of memory from the capacity of the physical partition to derive a derived reference value; determine that the current element value already stored in the element exceeds the derived reference value; prevent the reading out of the current element value to the host device; and provide the derived reference value instead of the current element value to the host device in response to receiving the request to read the current element value to ensure that that the request to read the current element value is valid.

Example M, the memory device of Example L, wherein the derived reference value represents a capacity of a single primary partition within the physical partition, wherein the physical partition is one of one or more physical partitions that comprise the memory of the memory device.

Example N, the memory device of any one of Example A through Example D, wherein: the element value comprises a current element value already stored in the element, the current element value being associated with a primary partition; the portion of the memory comprises a physical partition; the action comprises a request, from a host device, to read the current element value from the element; the actual characteristic related to the physical partition comprises a capacity of the physical partition; and the controller is further configured to: monitor for the request, from the host device, to read the current element value from the element; assess the reference value; subtract both a size of the first region of memory and a size of other primary partitions from the capacity of the physical partition to derive a derived reference value associated with the primary partition; determine that the current element value already stored in the element exceeds the derived reference value; prevent the reading out of the current element value to the host device; and provide the derived reference value instead of the current element value to the host device in response to receiving the request to read the current element value to ensure that that the request to read the current element value is valid.

Example O, the memory device of any one of Example A through Example N, wherein the controller is further configured to access the reference value via a third region of the memory, the third region of the memory comprising at least one of a register, a descriptor, an attribute, or a flag.

Example P, the memory device of Example A, wherein: the actual characteristic related to the portion of the memory is associated with a capacity of the first region of memory and the second region of memory combined; and the reference value is dynamically configurable based on hand shaking between a host device and the memory device to reduce the capacity.

Example Q, the memory device of any one of Example A through Example P, comprising one of a Secure Digital (SD) card, an embedded MultiMediaCard (eMMC) memory device, a Universal Flash Storage (UFS) card, a Peripheral Component Interconnect Express (PCIe) card or a solid-state drive (SSD).

Example R, the memory device of any one of Example A through Example Q, wherein the metadata is associated with one of a master boot record (MBR), a Globally Unique Identifier (GUID) Partition Table (GPT), or a Volume Boot Record (VBR).

Example S, the memory device of any one of Example A through Example R, wherein the reference value is stored in a setting that is one-time programmable by a manufacturer of a host device.

Example T, the memory device of any one of Example A through Example R, wherein the reference value is stored in a setting that requires a host device to be authenticated before the reference value is reprogrammed.

Example U, a method comprising: ensuring, by a controller of a memory device, that an action associated with an element of one or more elements is valid compared to a reference value associated with an actual characteristic related to a portion of a memory, wherein the memory comprises a first region storing metadata including the one or more elements that store one or more element values indicative of at least one characteristic related to the portion of the memory and a second region storing data at least partly in the portion of the memory.

Example V, the method of Example U, wherein the portion of the memory comprises at least one of: a primary partition, a physical partition, actual data area of a primary partition, or a logical unit.

Example W, the method of Example U, wherein an individual region of the memory comprises at least one of: a primary partition, a portion of a primary partition, a portion of a physical partition, file system metadata area of a primary partition, or a portion of a logical unit.

Example X, the method of any one of Example U through Example W, wherein the actual characteristic related to the portion of the memory is associated with one of: a total capacity of the memory device; a capacity of the first region of the memory and the second region of the memory combined; a capacity of the portion of the memory; a capacity of the second region of the memory; a start address of the portion or a region of the memory; an alignment of start addresses of the portion or a region of the memory; or a size of an allocation unit of the portion of the memory.

Example Y, the method of any one of Example U through Example X, wherein: the element value comprises a current element value already stored in the element; the action comprises a request, from a host device, to write an updated element value to the element to replace the current element value already stored in the element; the actual characteristic related to the portion of the memory is associated with a capacity of the memory device; and the method further comprises: monitoring for the request, from the host device, to write the updated element value to the element; assessing the reference value; determining that the updated element value exceeds the reference value; and preventing the writing of the updated element value to the element.

Example Z, the method of Example Y, further comprising writing the reference value to the element instead of the updated element value in response to receiving the request to write the updated element value.

Example AA, the method of any one of Example U through Example X, wherein: the element value comprises a current element value already stored in the element; the portion of the memory comprises a physical partition; the action comprises a request, from a host device, to write an updated element value to the element to replace the current element value already stored in the element; the actual characteristic related to the physical partition comprises a capacity of the physical partition; and the method further comprises: monitoring for the request, from the host device, to write the updated element value to the element; assessing the reference value; subtracting a size of the first region of memory from the capacity of the physical partition to derive a derived reference value; determining that the updated element value exceeds the derived reference value; and preventing the writing of the updated element value to the element.

Example BB, the method of Example AA, further comprising writing the derived reference value to the element instead of the updated element value in response to receiving the request to write the updated element value.

Example CC, the method of Example AA or Example BB, wherein the derived reference value represents a capacity of a single primary partition within the physical partition, and wherein the physical partition is one of one or more physical partitions that comprise the memory of the memory device.

Example DD, the method of any one of Example U through Example X, wherein: the element value comprises a current element value already stored in the element, the current element value being associated with a primary partition; the portion of the memory comprises a physical partition; the action comprises a request, from a host device, to write an updated element value to the element to replace the current element value already stored in the element; the actual characteristic related to the physical partition comprises a capacity of the physical partition; and the method further comprises: monitoring for the request, from the host device, to write the updated element value to the element; assessing the reference value; subtracting both a size of the first region of memory and a size of other primary partitions from the capacity of the physical partition to derive a derived reference value associated with the primary partition; determining that the updated element value exceeds the derived reference value; and preventing the writing of the updated element value to the element.

Example EE, the method of any one of Example U through Example X, wherein: the element value comprises a current element value already stored in the element; the action comprises a request, from a host device, to read the current element value from the element; the actual characteristic related to the portion of the memory is associated with a capacity of the memory device; and the method further comprises: monitoring for the request, from the host device, to read the current element value from the element; assessing the reference value; determining that the current element value already stored in the element exceeds the reference value; preventing the reading out of the current element value to the host device; and providing the reference value instead of the current element value to the host device in response to receiving the request to read the current element value to ensure that that the request to read the current element value is valid.

Example FF, the method of any one of Example U through Example X, wherein: the element value comprises a current element value already stored in the element; the portion of the memory comprises a physical partition; the action comprises a request, from a host device, to read the current element value from the element; the actual characteristic related to the physical partition comprises a capacity of the physical partition; and the method further comprises: monitoring for the request, from the host device, to read the current element value from the element; assessing the reference value; subtracting a size of the first region of memory from the capacity of the physical partition to derive a derived reference value; determining that the current element value already stored in the element exceeds the derived reference value; preventing the reading out of the current element value to the host device; and providing the derived reference value instead of the current element value to the host device in response to receiving the request to read the current element value to ensure that that the request to read the current element value is valid.

Example GG, the method of Example FF, wherein the derived reference value represents a capacity of a single primary partition within the physical partition, wherein the physical partition is one of one or more physical partitions that comprise the memory of the memory device.

Example HH, the method of any one of Example U through Example X, wherein: the element value comprises a current element value already stored in the element, the current element value being associated with a primary partition; the portion of the memory comprises a physical partition; the action comprises a request, from a host device, to read the current element value from the element; the actual characteristic related to the physical partition comprises a capacity of the physical partition; and the method further comprises: monitoring for the request, from the host device, to read the current element value from the element; assessing the reference value; subtracting both a size of the first region of memory and a size of other primary partitions from the capacity of the physical partition to derive a derived reference value associated with the primary partition; determining that the current element value already stored in the element exceeds the derived reference value; preventing the reading out of the current element value to the host device; and providing the derived reference value instead of the current element value to the host device in response to receiving the request to read the current element value to ensure that that the request to read the current element value is valid.

Example II, the method of any one of Example U through Example HH, further comprising accessing the reference value via a third region of the memory, the third region of the memory comprising at least one of a register, a descriptor, an attribute, or a flag.

Example JJ, the method of Example U, wherein: the actual characteristic related to the portion of the memory is associated with a capacity of the first region of memory and the second region of memory combined; and the reference value is dynamically configurable based on hand shaking between a host device and the memory device to reduce the capacity.

Example KK, the method of any one of Example U through Example JJ, wherein the memory device comprises one of a Secure Digital (SD) card, an embedded MultiMediaCard (eMMC) memory device, a Universal Flash Storage (UFS) card, a Peripheral Component Interconnect Express (PCIe) card or a solid-state drive (SSD).

Example LL, the method of any one of Example U through Example KK, wherein the metadata is associated with one of a master boot record (MBR), a Globally Unique Identifier (GUID) Partition Table (GPT), or a Volume Boot Record (VBR).

Example MM, the method of any one of Example U through Example LL, wherein the reference value is stored in a setting that is one-time programmable by a manufacturer of a host device.

Example NN, the method of any one of Example U through Example LL, wherein the reference value is stored in a setting that requires a host device to be authenticated before the reference value is reprogrammed.

Example OO, one or more computer-readable storage media storing instructions that, when executed, perform the method of any one of Example U through Example NN.

Although a feature may appear to be described in connection with a particular embodiment, one skilled in the art would recognize that various features of the described embodiments may be combined. Moreover, aspects described in connection with an embodiment may stand alone.

The invention claimed is:

1. A memory device comprising:
a memory comprising:
at least one physical partition comprising:
a first region of the memory storing metadata including one or more elements to store one or more element values indicative of a size or an address related to a portion of the at least one physical partition of the memory; and
a second region of the memory storing data at least partly in the portion of the memory; and
a controller configured to ensure that an action associated with an element of the one or more elements is valid compared to a derived reference value, the derived reference value based at least in part on a reference value associated with an actual characteristic related to the at least one physical partition of the memory, wherein:
the one or more element values comprises a current element value already stored in the element;
the action comprises a request, from a host device, to write an updated element value to the element to replace the current element value already stored in the element;
the actual characteristic related to the physical partition comprises a capacity of the physical partition; and
the controller is further configured to:
monitor for the request, from the host device, to write the updated element value to the element;
assess the reference value;
subtract at least a size of the first region of the memory from the capacity of the physical partition to derive the derived reference value;
determine that the updated element value exceeds the derived reference value; and
prevent writing the updated element value to the element.

2. The memory device of claim 1, wherein the portion of the memory further comprises at least one of: a primary partition, an actual data area of a primary partition, or a logical unit.

3. The memory device of claim 1, wherein an individual region of the memory comprises at least one of: a primary partition, a portion of a primary partition, a portion of the physical partition, a file system metadata area of a primary partition, or a portion of a logical unit.

4. The memory device of claim 1, wherein the size or the address related to the portion of the memory is associated with one of:
a total capacity of the memory device;
a capacity of the first region of the memory and the second region of the memory combined;
a capacity of the portion of the memory;
a capacity of the second region of the memory;
a start address of the portion or a region of the memory;
an alignment of start addresses of the portion or a region of the memory; or
a size of an allocation unit of the portion of the memory.

5. The memory device of claim 1, wherein the controller is further configured to write the derived reference value to the element instead of the updated element value in response to receiving the request to write the updated element value.

6. The memory device of claim 1, wherein the controller is further configured to access the reference value via a third region of the memory, the third region of the memory comprising at least one of a register, a descriptor, an attribute, or a flag; and
wherein the third region of the memory (i) is one-time programmable by a first manufacturer of a host device or a second manufacturer of the memory device, or (ii) requires a host device to be authenticated before the reference value is reprogrammed in the third region.

7. The memory device of claim 1, comprising one of a Secure Digital (SD) card, an embedded MultiMediaCard (eMMC) memory device, a Universal Flash Storage (UFS)

card, a Peripheral Component Interconnect Express (PCIe) card or a solid-state drive (SSD).

8. The memory device of claim 1, wherein the metadata is associated with one of a master boot record (MBR), a Globally Unique Identifier (GUID) Partition Table (GPT), or a Volume Boot Record (VBR).

9. The memory device of claim 1, wherein the controller is further configured to:
subtract a size of another primary partition within the physical partition from the capacity of the physical partition to derive the derived reference value.

10. A method comprising:
ensuring, by a controller of a memory device, that an action associated with an element of one or more elements is valid compared to a derived reference value, the derived reference value based at least in part on a reference value associated with an actual characteristic related to a physical partition of a memory, wherein:
the memory comprises a first region storing metadata including the one or more elements that store one or more element values indicative of a size or an address related to a portion of the memory and a second region storing data at least partly in the portion of the memory,
the one or more element values comprises a current element value already stored in the element;
the action comprises a request, from a host device, to read the current element value from the element; and
the actual characteristic related to the physical partition comprises a capacity of the physical partition; and
monitoring for the request, from the host device, to read the current element value from the element;
assessing the reference value;
subtracting at least a size of the first region of the memory from the capacity of the physical partition to derive the derived reference value;
determining that the current element value already stored in the element exceeds the derived reference value;
preventing reading out of the current element value to the host device; and
providing the derived reference value instead of the current element value to the host device in response to receiving the request to read the current element value to ensure that that the request to read the current element value is valid.

11. The method of claim 10, wherein the portion of the memory further comprises at least one of: a primary partition, an actual data area of a primary partition, or a logical unit.

12. The method of claim 10, wherein an individual region of the memory comprises at least one of: a primary partition, a portion of a primary partition, a portion of the physical partition, a file system metadata area of a primary partition, or a portion of a logical unit.

13. The method of claim 10, wherein the size or the address related to the portion of the memory is associated with one of:
a total capacity of the memory device;
a capacity of the first region of the memory and the second region of the memory combined;
a capacity of the portion of the memory;
a capacity of the second region of the memory;
a start address of the portion or a region of the memory;
an alignment of start addresses of the portion or a region of the memory; or
a size of an allocation unit of the portion of the memory.

14. The method of claim 10, further comprising:
accessing the reference value via a third region of the memory, the third region of the memory comprising at least one of a register, a descriptor, an attribute, or a flag;
wherein the third region of the memory (i) is one-time programmable by a first manufacturer of a host device or a second manufacturer of the memory device, or (ii) requires a host device to be authenticated before the reference value is reprogrammed in the third region.

15. The method of claim 10, further comprising:
subtracting a size of an alignment overhead region from the capacity of the physical partition to derive the derived reference value.

16. A memory device comprising:
a memory including:
a first region of the memory storing metadata including one or more elements to store one or more element values indicative of a size or an address related to a portion of the memory; and
a second region of the memory storing data at least partly in the portion of the memory; and
a controller configured to ensure that an action associated with an element of the one or more elements is valid compared to a derived reference value, the derived reference value based at least in part on a reference value associated with an actual characteristic related to a physical partition of the memory, wherein:
the one or more element values comprises a current element value already stored in the element;
the action comprises a request, from a host device, to read the current element value from the element;
the actual characteristic related to the physical partition comprises a capacity of the physical partition; and
the controller is further configured to:
monitor for the request, from the host device, to read the current element value from the element;
assess the reference value;
subtract at least a size of the first region of the memory from the capacity of the physical partition to derive the derived reference value;
determine that the current element value already stored in the element exceeds the derived reference value;
prevent reading out of the current element value to the host device; and
provide the derived reference value instead of the current element value to the host device in response to receiving the request to read the current element value to ensure that that the request to read the current element value is valid.

17. The memory device of claim 16, wherein the controller is further configured to access the reference value via a third region of the memory, the third region of the memory comprising at least one of a register, a descriptor, an attribute, or a flag; and
wherein the third region of the memory (i) is one-time programmable by a first manufacturer of a host device or a second manufacturer of the memory, or (ii) requires a host device to be authenticated before the reference value is reprogrammed in the third region.

18. The memory device of claim 16, wherein the controller is further configured to:

subtract a size of another primary partition or a size of an alignment overhead region from the capacity of the physical partition to derive the derived reference value.

* * * * *